United States Patent Office 2,759,302
Patented Aug. 21, 1956

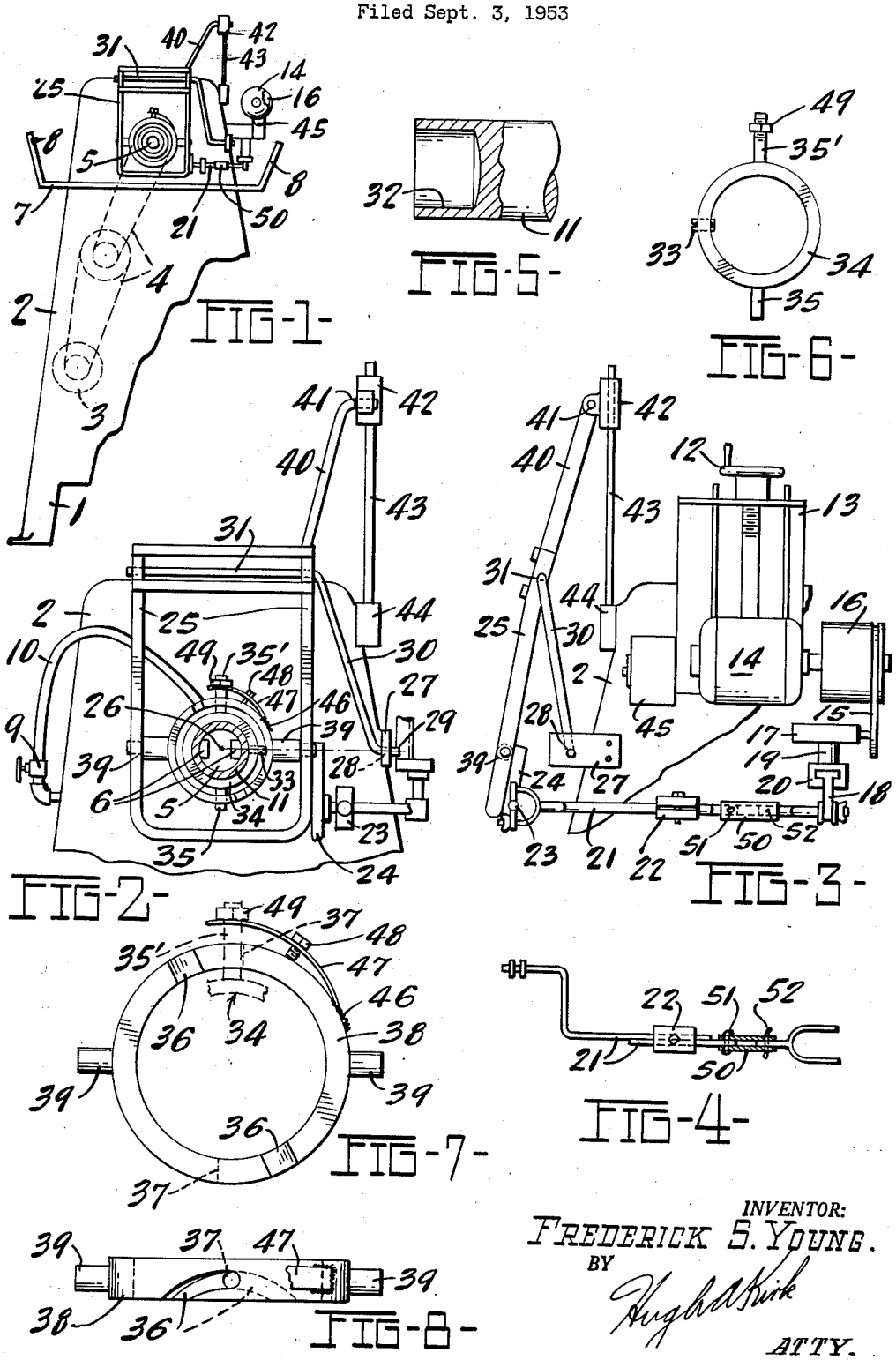

2,759,302

HONING

Frederick S. Young, Toledo, Ohio, assignor to Pioneer Toledo Corporation, Toledo, Ohio, a corporation of Ohio and National Pioneer, Inc., Toledo, Ohio, a corporation of Ohio Application September 3, 1953, Serial No. 378,272

9 Claims. (Cl. 51—92)

This invention relates to niceties of control between tool and work in successive cycles of operation.

This invention has utility when incorporated as a work holder and the mounting for a relatively movable tool. More specifically as herein disclosed, there is a tool of the type of a rotary element having an abrader carried thereby; while the work holder is centered therewithin holding the work for an internal cylindrical face to be treated, as in smoothing, buffing, polishing, or honing. The abrading face is harder than the work and the fineness of the abrader is adopted according to the character of the work, its material and the type of face to be produced, especially as to accuracy of dimension and type of finish.

Referring to the drawings:

Fig. 1 is a side elevation of a rotary hone type of power tool, having the work holder as an accessory adapted thereto, parts of the tool frame being broken away, some of the showing being diagrammatic;

Fig. 2 is a view on a larger scale than Fig. 1, showing the work carrier and the actuator connections therefor;

Fig. 3 is a view from the right of Fig. 2 of the actuator connections from a power source therefor;

Fig. 4 is a plan view of an adjustable connecting rod in the connections of Fig. 3;

Fig. 5 is a side elevation, with portions broken away, of an item of work;

Fig. 6 is a front elevation of a holding ring with which the item of work is directly assembled;

Fig. 7 is a front elevation of an outer ring for the holder in which the work holding ring is relatively rockably mounted; and Fig. 8 is an edge or plan view of the outer ring of Fig. 7, which outer ring is adapted to be rockably mounted in a stirrup of the holder accessory, the work position neutralizer being omitted.

Feet 1 carry a frame or housing 2 having therein an electric motor 3 with speed reduction transmission 4 upwardly therefrom to rotate a horizontal shaft 5 having a pair of diametrically disposed adjustable abrader or hone faces 6 protruding outward from the frame 2 over a pan 7 having splash deflectors 8. A valve 9 is adjustable for supply of coolant thru duct 10 to work 11 to be treated.

A hand wheel 12 (Fig. 3) on frame extension 13 is operable to adjust an electric motor 14 for maintaining taut a belt 15 from adjustable pulley device 16. The belt 15 extends to a speed reduction device 17 having an adjustable wristpin or variable effective length crank arm bearing 18 carried by a downwardly extending shaft 19 from the device 17 on which is a crank or radial channel 20 providing mounting for the wristpin 18. The motor 14 is a power drive for the work handling accessory in this honing equipment and is located on the frame upper portion with a connecting rod 21 having a spanning or bridging coupling forming length adjustment means 22 (Fig. 4).

The connecting rod or link 21 extends to a universal type joint connection or rockable bearing 23, similar to the link connection to the wristpin 18. The bearing 23 is at an arm or crank 24 fixed with a stirrup or U-section 25.

Co-planar with axis 26 of the shaft 5 a bearing block 27 fixed with the frame 2 provides a pivot bearing 28 having its axis extend at right angle to and toward the axis 26 of the shaft 5. In this bearing 28 is rockably mounted angle end 29 of an arm 30 rising to a horizontal portion 31 extending thru the legs of the U-section 25 and there providing a floating bearing for the section 25 which floating bearing is parallel to the axis of the bearing 28 in its extent to intersect the axis of the shaft 5.

Considering item of work 11 with an interior cylindrically concave face 32 (Fig. 5) to be treated, a set screw 33 may fit this work 11 in a ring 34 (Fig. 6).

The ring 34 is the inner or primary fitting of the accessory or holder for the work. Diametrically there protrudes pivot pins 35, 35' from the ring 34. The primary ring 34 as thus assembled with the work 11 to be treated, is thrust into position on the shaft 5 for locating the face 32 on the hone faces 6. In this course, the pins 35 ride into cam ways 36 to seats 37 in a second or outer ring 38. Considering that the shaft 5 as viewed from the front (Figs. 1, 7) has a right-hand or clockwise direction of rotation, with the outer ring 38 having pivotal diametrical connections 39 with the pair of riser legs of the U-section 25, the outer ring 38 is held from rotation and the tendency of the abrader or faces 6 to carry the work 11 therewith effects a holding drag in thus assembling the work in a universal bearing, and with the pins 35 thus held in the seats 37.

The arm 30 from the bearing 28 and the legs of the U-section 25 from the rocking bearings 39 each to the floating bearing 31 being equal (in that the distance from the axis of the floating fulcrum bearing 31 to the axis of the fixed bearing 29 is the same as the distance from the bearing 31 to the axis of the bearing 39) there is thus defined two equal sides of a vertical apex isosceles triangle from a horizontal base between the axis line 26 of the shaft 5 and the axis of the bearing 28. With the bearings 39, 28, fixed, the floating of the bearing 31 means that the back and forth shifting of the ring pair 34, 38, is in a straight line, and horizontal as shown. The slight lift of the floating bearing 31 is stabilized by an upstanding lever arm or extension 40 from the U-section 25 one leg. The upper end of the arm 40 has a pivotal connection 41 to a slide 42 on an upright rod 43 held rigid with the frame 2 by a bracket 44.

The work adjustment as to the ring 34 desirably has the mid position for the stroke centrally of the length of the face 32 to be treated. The adjustment of the stroke or swing of the ring pair 34, 38, is nicely and readily effected by adjustment of the throw of the crank 20 at the wristpin 18, and then setting of the link 21 by its adjustment device 22. For the motor 14 there is an adjustable controller 45.

For treating an area, it is to be noted that the work has successive courses of similar transit as developed from the rotation of the shaft 5. A second and relatively crosswise direction of motion or oscillation in successive cycles for like area on the work is carried by the forth-and-back transit of the holder. The treating is performed by the abrader regions 6 of the shaft 5. By location of the poising means, the holder for the work has axis identity with that of the shaft 5, and true concentricity is developed on the item of work face area being simultaneously two way treated.

The materials of the abrader and the materials of the work are important factors in required efficient adjustment adaptations adequately taken into account hereunder. When there is developed a standard or constant character of work being handled, equipment set-up therefor may minimize, if not totally eliminate, occasion for adjustment in the several ranges herein disclosed.

An attaching means or weld 46 (Fig. 7) may attach an end of a leaf spring 47 on the outer member 38 of the gimbal mounting. A set screw 48 may adjust this spring 47 to regulate the poising, balancing or load neutralizing action of the free end of this spring 47 as embracing radial pin 35' of the inner gimbal member 34, as held by a nut 49 adjustable along this pin 35'. It is thus seen that the flex position for the free end of the spring 47 may be set for depression or lift of the element 34 in which the work 11 is fixed. The operation experience from establishing this condition is that the action of the abrader is uniform thruout the area being treated. The initial setting may be in conformity to the item of work. Upon special occasion there may be adjustment in the carrying thru of the surface treating.

While normal operations are carried thru as free for uniformity of transit load, emergency may arise, even to grabbing or binding action occurring. It is important that no such excess thrust be transmitted to the work. Elimination of such hazard is cared for thru fixing a sleeve 50 (Fig. 3) by a rivet or attaching means 51 with a portion of the link 21. This sleeve 50 extends to telescope with an aligned section of the link 21, and there a frangible pin or small copper wire 52 thru an opening thru the sleeve 50 in register with an opening thru the section of the link 31 therein provides normal load transmission, but at overload, this coupling gives way. A substitute pin 52 is required to carry thru for further operation.

What is claimed and it is desired to secure by Letters Patent is:

1. Surface treating equipment comprising a support having a bearing, a rotatable shaft in the bearing and projecting to have a free end extension therefrom, an abrader mounted at the extension with an orbit of rotation coaxial with the shaft, a work holder, a straight line transit control directing the holder for reciprocation toward and from the bearing, said control comprising a lever having one arm thereof extending to a slide mounted bearing, remote from the slide bearing said lever having rockable connection to the holder approximately coplanar with the axis of the shaft, a fixed pivot bearing approximately coplanar with the axis of said shaft, and a link from the coaxial fixed pivot bearing to a pivot on said lever spaced from the rockable connection and the sliding bearing to provide a floating fulcrum.

2. The equipment of claim 1 wherein there is a drive for rotating the shaft, and an actuator for the holder.

3. The equipment of claim 2 wherein there is actuator adjusting means for varying the transit stroke of the holder.

4. The equipment of claim 2 wherein there is actuator adjusting means for varying the mean stroke position of the holder.

5. The equipment of claim 2 in which the actuator includes a frangible transmission connection.

6. The equipment of claim 2 in which the actuator includes an overload release.

7. The equipment of claim 1 wherein the rockable connection is a universal joint.

8. The equipment of claim 7 wherein the universal joint is of gimbal type.

9. The equipment of claim 1 in which the rockable connection includes a work mass balancing adjustable spring.

References Cited in the file of this patent

UNITED STATES PATENTS

| | | |
|---|---|---|
| 1,875,537 | Williams | Sept. 6, 1932 |
| 2,149,519 | Frunk | Mar. 7, 1939 |
| 2,356,272 | Reynolds | Aug. 22, 1944 |
| 2,438,695 | Drake | Mar. 30, 1948 |
| 2,649,664 | Sunnen | Aug. 25, 1953 |

FOREIGN PATENTS

| | | |
|---|---|---|
| 485,407 | Germany | Oct. 31, 1929 |
| 856,108 | Germany | Nov. 20, 1952 |